United States Patent
Wei et al.

(10) Patent No.: US 11,087,624 B2
(45) Date of Patent: Aug. 10, 2021

(54) SAFE-TO-PROCEED SYSTEM FOR AN AUTOMATED VEHICLE

(71) Applicant: Motional AD LLC, Boston, MA (US)

(72) Inventors: Junqing Wei, Bridgeville, PA (US); Gaurav Bhatia, Pittsburgh, PA (US); Wenda Xu, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 98 days.

(21) Appl. No.: 16/303,075

(22) PCT Filed: May 4, 2017

(86) PCT No.: PCT/US2017/031004
§ 371 (c)(1),
(2) Date: Nov. 19, 2018

(87) PCT Pub. No.: WO2017/200754
PCT Pub. Date: Nov. 23, 2017

(65) Prior Publication Data
US 2019/0304308 A1    Oct. 3, 2019

Related U.S. Application Data

(63) Continuation of application No. 15/159,234, filed on May 19, 2016, now abandoned.

(51) Int. Cl.
*G08G 1/16* (2006.01)
*B60W 30/09* (2012.01)
(Continued)

(52) U.S. Cl.
CPC ............. *G08G 1/162* (2013.01); *B60W 30/09* (2013.01); *B60W 30/18154* (2013.01);
(Continued)

(58) Field of Classification Search
CPC ........ G08G 1/162; G08G 1/163; G08G 1/164; G08G 1/166; B60W 30/09;
(Continued)

(56) References Cited

U.S. PATENT DOCUMENTS 6,067,031 A * 5/2000 Janky .................... G01S 13/931
340/903
2005/0143889 A1 6/2005 Isaji et al.
(Continued)

FOREIGN PATENT DOCUMENTS

JP    2005-189983    7/2005

OTHER PUBLICATIONS

International Search Report and Written Opinion in International Application No. PCTUS2017/031004, dated Jul. 20, 2017, 8 pages.
(Continued)

*Primary Examiner* — Michael V Kerrigan
(74) *Attorney, Agent, or Firm* — Fish & Richardson P.C.

(57) ABSTRACT

A safe-to-proceed system (10) for operating an automated vehicle proximate to an intersection (14) includes an intersection-detector (18), a vehicle-detector (20), and a controller (24). The intersection-detector (18) is suitable for use on a host-vehicle (12). The intersection-detector (18) is used to determine when a host-vehicle (12) is proximate to an intersection (14). The vehicle-detector (20) is also suitable for use on the host-vehicle (12). The vehicle-detector (20) is used to estimate a stopping-distance (22) of an other-vehicle (16) approaching the intersection (14). The controller (24) is in communication with the intersection-detector (18) and the vehicle-detector (20). The controller (24) is configured to prevent the host-vehicle (12) from entering the intersection (14) when the stopping-distance (22) indicates that the other-vehicle (16) will enter the intersection (14) before stopping.

7 Claims, 2 Drawing Sheets

(51) Int. Cl.
*B60W 30/18* (2012.01)
*G05D 1/02* (2020.01)

(52) U.S. Cl.
CPC ......... *G05D 1/0231* (2013.01); *G05D 1/0257* (2013.01); *G05D 1/0278* (2013.01); *G08G 1/163* (2013.01); *G08G 1/164* (2013.01); *G08G 1/166* (2013.01); *B60W 2400/00* (2013.01); *B60W 2420/403* (2013.01); *B60W 2420/52* (2013.01); *B60W 2554/00* (2020.02); *B60W 2556/00* (2020.02)

(58) Field of Classification Search
CPC ....... B60W 30/18154; B60W 2554/00; B60W 2556/00; B60W 2400/00; B60W 2420/403; B60W 2420/52; B60W 2050/143; B60W 50/14; G05D 1/0231; G05D 1/0257; G05D 1/0278
See application file for complete search history.

(56) References Cited

U.S. PATENT DOCUMENTS

| | | |
|---|---|---|
| 2011/0106442 A1* | 5/2011 | Desai ............... G01S 19/14 701/532 |
| 2011/0153166 A1 | 6/2011 | Yester |
| 2012/0016581 A1 | 1/2012 | Mochizuki et al. |
| 2012/0112895 A1 | 5/2012 | Jun |
| 2013/0018572 A1 | 1/2013 | Jang |
| 2014/0327532 A1 | 11/2014 | Park |
| 2017/0337819 A1 | 11/2017 | Wei et al. |

OTHER PUBLICATIONS

International Preliminary Report on Patentability in International Application No. PCT/US2017/031004, dated Nov. 20, 2018, 7 pages.

* cited by examiner

SAFE-TO-PROCEED SYSTEM FOR AN AUTOMATED VEHICLE

CROSS-REFERENCE TO RELATED APPLICATIONS

This application is a U.S. National Phase Application of International Patent Application No. PCT/US2017/031004 filed on May 4, 2017, which claims priority to the benefit of U.S. patent application Ser. No. 15/159,234 entitled "SAFE-TO-PROCEED SYSTEM FOR AN AUTOMATED VEHICLE" filed on May 19, 2016, which is herein incorporated by reference in its entirety both of which are incorporated herein by reference in their entirety.

TECHNICAL FIELD OF INVENTION

This disclosure generally relates to a safe-to-proceed system that operates an automated vehicle, and more particularly relates to a system configured to prevent a host-vehicle from entering an intersection when the stopping-distance of an other-vehicle indicates that the other-vehicle will not stop before entering the intersection.

BACKGROUND OF INVENTION

It is generally a poor driving safety practice for an operator or controller of a host-vehicle to assume that an other-vehicle is going to safely stop while approaching an intersection that the host-vehicle is about to enter, especially if roadway conditions are such that traction is less than optimal, and/or rainfall or snowfall makes it difficult for the other-vehicle to detect the presence of the intersection or traffic-control signs/signals at the intersection.

SUMMARY OF THE INVENTION

In accordance with one embodiment, a safe-to-proceed system for operating an automated vehicle proximate to an intersection is provided. The system includes an intersection-detector, a vehicle-detector, and a controller. The intersection-detector is suitable for use on a host-vehicle. The intersection-detector is used to determine when a host-vehicle is proximate to an intersection. The vehicle-detector is also suitable for use on the host-vehicle. The vehicle-detector is used to estimate a stopping-distance of an other-vehicle approaching the intersection. The controller is in communication with the intersection-detector and the vehicle-detector. The controller is configured to prevent the host-vehicle from entering the intersection when the stopping-distance indicates that the other-vehicle will enter the intersection before stopping.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
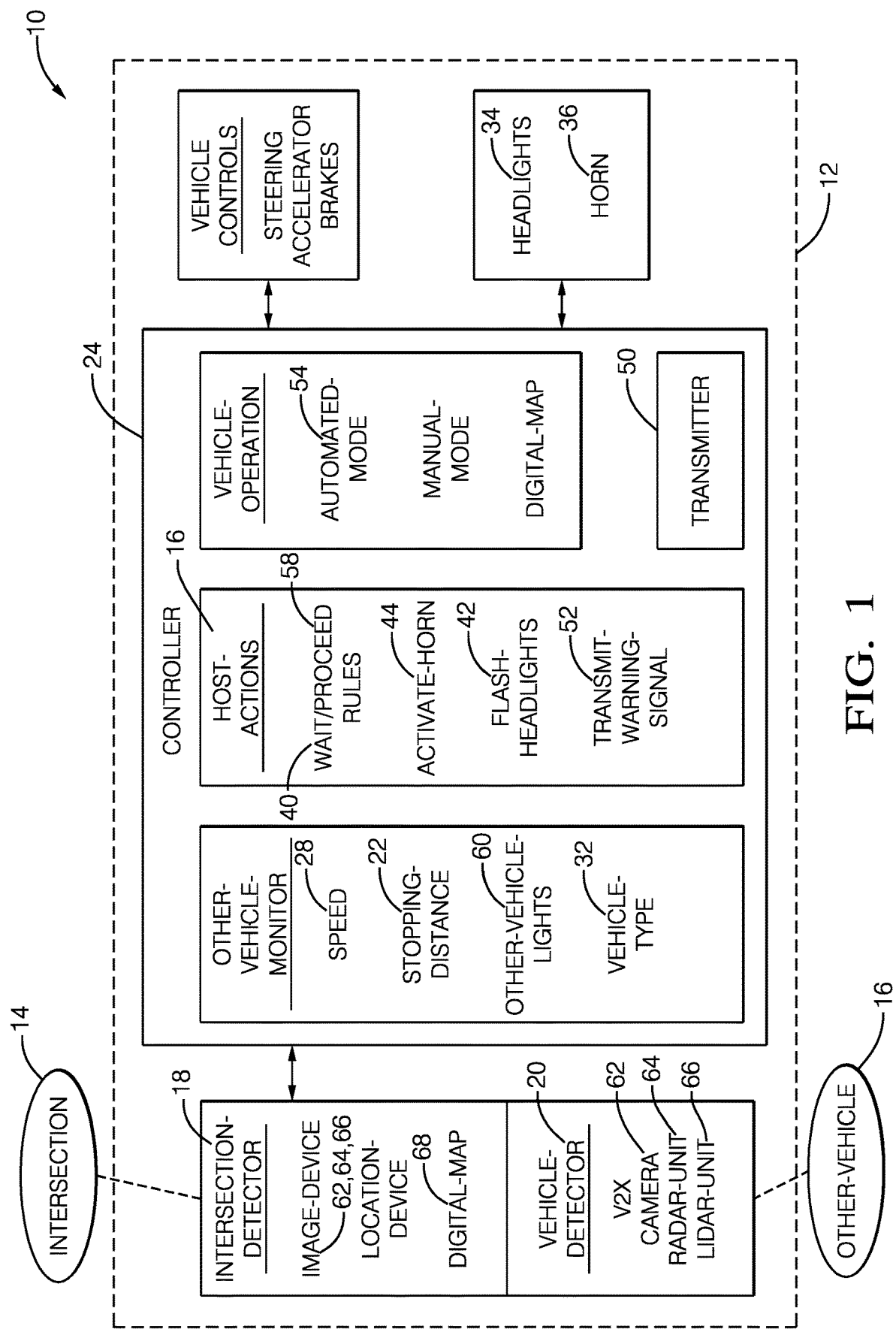
FIG. 1 is a diagram of a safe-to-proceed system in accordance with one embodiment.

FIG. 1 illustrates a non-limiting example of a safe-to-proceed system 10, hereafter referred to as the system 10. The system 10 is generally configured for operating an automated vehicle, hereafter referred to as the host-vehicle 12, particularly when the host-vehicle 12 is proximate to a traffic-intersection 14 (FIG. 2), hereafter the intersection 14. As used herein, the word 'proximate' is used to indicate that something is close enough to warrant consideration by the system 10 for the purpose of safely operating the host-vehicle 12. For example, within one-hundred meters (100m) would likely be considered proximate, but further than one-kilometer (1 km) would likely not be considered proximate. In general, the system 10 is configured to estimate or determine when an other-vehicle 16 that is approaching the intersection 14 is able to stop, and operate the host-vehicle 12 to wait 40 if the other-vehicle 16 is estimated (i.e.— predicted, forecasted, or determined) to be moving too fast to safely stop before entering the intersection 14. While the non-limiting examples presented herein are generally directed to a fully automated or autonomous vehicle, it is contemplated that the teaching presented herein are also applicable to vehicles that are for the most part manually operated or driven by a human-operator (not shown), and the system 10 only becomes active to assist the human-operator to, for example, avoid a collision with the other-vehicle 16 at the intersection 14.

The system 10 includes an intersection-detector 18 suitable for use on the host-vehicle 12. By way of example and not limitation, the intersection-detector 18 may include an image-device such as one of, or any combination of, a camera 62, a lidar-unit 66, and a radar-unit 64. The function of the intersection-detector 18 may be provided by a location-device such as a global-positioning-system (GPS) receiver in combination with a digital-map 68. Whatever the configuration, the intersection-detector 18 is used to determine when a host-vehicle 12 is proximate to (i.e. close to or approaching) the intersection 14, and those in the art will recognize how the various devices suggested above can be used to provide this function.

The system 10 also includes a vehicle-detector 20 suitable for use on the host-vehicle 12 to detect the other-vehicle 16. By way of example and not limitation, the vehicle-detector 20 may be one of, or any combination of, a camera 62, a lidar-unit 66, and a radar-unit 64. It is contemplated that, for example, both the intersection-detector 18 and the vehicle-detector 20 may make use of images captured by same camera 62 to detect the intersection 14 and the other-vehicle 16, respectively. That is, the camera 62, radar-unit 64, and/or lidar-unit 66 may be shared by the intersection-detector 18 and the vehicle-detector 20. The vehicle-detector 20 is used to estimate a stopping-distance 22 of the other-vehicle 16 approaching the intersection 14, as will be explained in more detail below. The function of the vehicle-detector 20 may also be provided or supplemented by a transceiver (not shown) configured for vehicle-to-infrastructure (V2I) communications, vehicle-to-vehicle (V2V) communications, and/or vehicle-to-pedestrian (V2P) communications, which may be generically labeled as V2X communications, as will be recognized by those in the art.

The system 10 also includes a controller 24 in communication with the intersection-detector 18 and the vehicle-detector 20. The controller 24 may include a processor (not specifically shown) such as a microprocessor or other control circuitry such as analog and/or digital control circuitry including an application specific integrated circuit (ASIC) for processing data as should be evident to those in the art. The controller 24 may include memory (not specifically shown), including non-volatile memory, such as electrically erasable programmable read-only memory (EEPROM) for storing one or more routines, thresholds, and captured data. The one or more routines may be executed by the processor to perform steps for determining the stopping-distance 22 based on signals received by the controller 24 for controlling the host-vehicle 12 as described herein. In particular, the controller 24 is configured to prevent the host-vehicle 12 from entering the intersection 14 when the stopping-distance 22 of the other-vehicle 16 indicates that the other-vehicle 16 will enter the intersection 14 without stopping.

Figure 2:
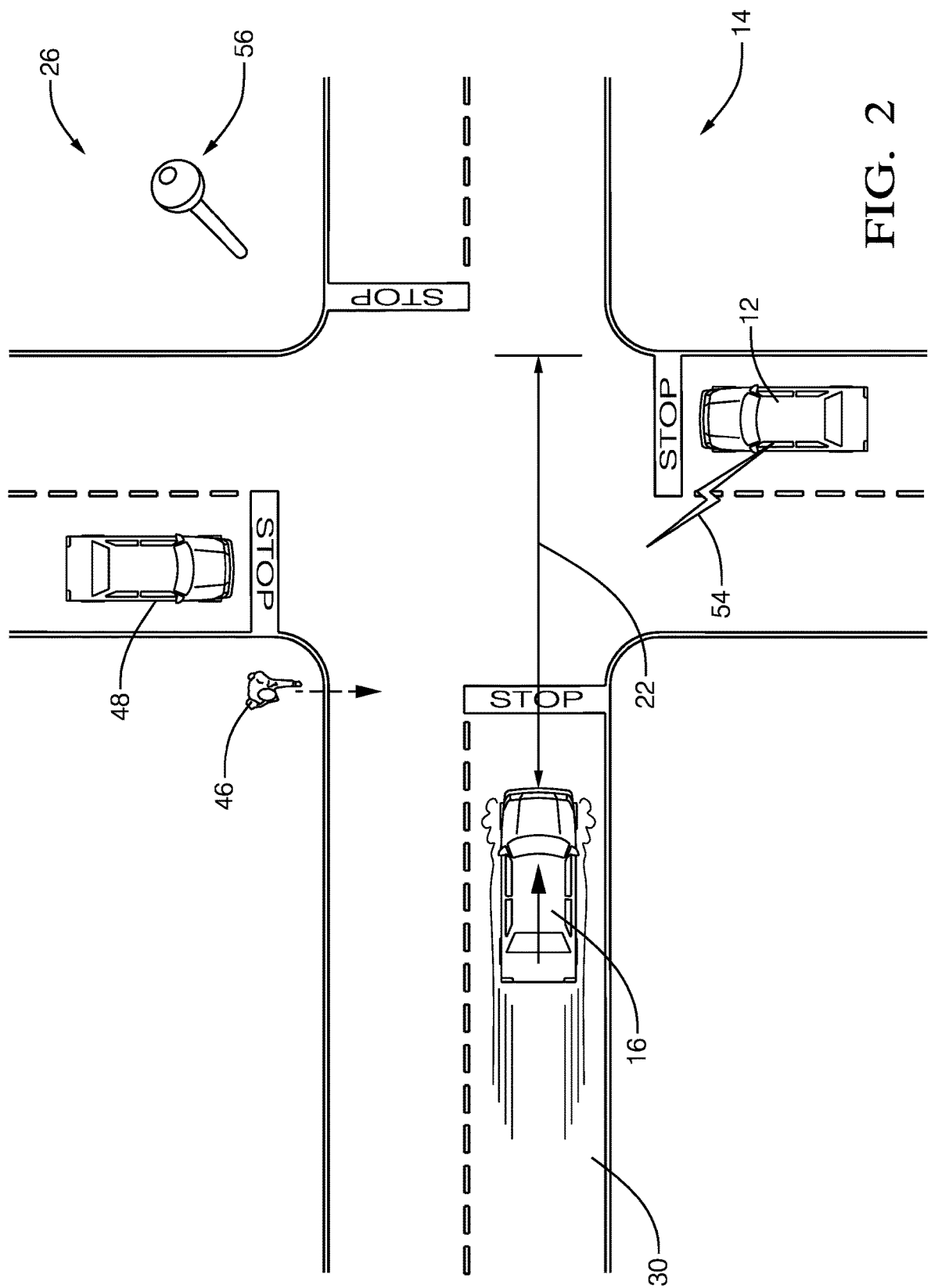
FIG. 2 is a traffic-scenario encountered by the system of FIG. 1 in accordance with one embodiment.

FIG. 2 illustrates a non-limiting example of a traffic-scenario 26 that may be encountered by the host-vehicle 12 where the host-vehicle 12 is stopped at the intersection 14 and the other-vehicle 16 is approaching or moving toward the intersection 14. Based on signals from the vehicle-detector 20 the controller 24 can determine a speed 28 of the other-vehicle 16 and then use a braking-model or algorithm for a typical vehicle to estimate the stopping-distance 22 of the other-vehicle 16 if the other-vehicle 16 were to apply, for example, maximum braking-effort at the instant the speed 28 was determined. In the example shown in FIG. 2, the stopping-distance 22 is such that it is likely that the other-vehicle 16 will not be able to stop before entering the intersection 14, so the controller 24 keeps the host-vehicle 12 at the present position shown so a collision with the other-vehicle 16 is avoided even though the host-vehicle 12 may have the right-of-way.

The controller 24 may also determine a long-stopping-distance (not shown) based on the other-vehicle 16 applying a typical braking-effort (i.e. less than maximum braking-effort). The long-stopping-distance may be used by the controller 24 to determine a threat-level of the other-vehicle 16. For example, if the long-stopping-distance suggests that the other-vehicle 16 can easily stop before entering the intersection 14, e.g. the other-vehicle 16 is traveling slower and/or is further away from the intersection 14 than as illustrated in FIG. 2, the threat-level may be set at LOW. However, if the other-vehicle 16 continues to travel toward the intersection 14 and no change in the speed 28 is detected, the threat-level may be increased to, for example, MEDIUM or HIGH.

The controller 24 may also consider other variables when the estimate of the stopping-distance 22 is determined. For example, V2V communications or the camera 62 may be used to determine a vehicle-type 32, e.g. large-truck vs. small-automobile vs. motorcycle, so that a more accurate estimate of the stopping-distance 22 can be determined. Road conditions may be determined using V2X communications to receive slippery-road or icy-road messages originating from vehicles that previously passed through the intersection 14, or a detected traction-loss by the host-vehicle 12 may suggest that traction-conditions are less than optimum, either of which could be used by the controller 24 to increase the estimate of the stopping-distance 22. The camera 62 or the lidar-unit 66 may be used to determine if the travel-lane 30 of the other-vehicle 16 is flat, or has an uphill or downhill slope which would further influence the stopping-distance 22.

In addition to operating the host-vehicle 12 to wait 40 to enter the intersection 14 when the stopping-distance 22 of the other-vehicle 16 indicates that the other-vehicle 16 will not stop before entering the intersection 14, the system 10 may be further configured to warn other of potential danger. For example, since it is likely that the host-vehicle 12 is equipped with headlights 34 and a horn 36, the controller 24 may be further configured to flash 42 the headlights 34 and/or activate 44 the horn 36 when the stopping-distance 22 indicates that the other-vehicle 16 will enter the intersection 14 before or without stopping. Such action may be effective to warn a pedestrian 46 who appears to be entering the intersection 14 and may not recognize the danger of the other-vehicle 16 not stopping because the pedestrian 46 is, for example, texting. The action may also be effective to warn a waiting-vehicle 48 whose view of the other-vehicle 16 may be blocked by the pedestrian 46, for example.

As another option to warn others of the danger represented by the other-vehicle 16 not stopping, the system 10 may include a transmitter 50 used to transmit a warning-signal 54, and controller 24 may be configured activate the transmitter 50 to transmit 52 the warning-signal 54 when the stopping-distance 22 indicates that the other-vehicle 16 will enter the intersection 14 before stopping. The transmitter 50 may be part of the transceiver for V2X communications discussed above. Alternatively, the transmitter 50 may be a light-source such as an infrared-light-source used to broadcast local messages that can be detected by other properly equipped vehicles and/or a V2I communications device 56 located proximate to the intersection 14.

In another embodiment, the camera 62 may be used to detect light emitted by lights 60 on the other-vehicle 16. For example, the other-vehicle 16 may an ambulance equipped with emergency-lights that if activated will cause the system 10 to operate the host-vehicle 12 to wait 40 until the other-vehicle 16 has cleared the intersection 14. Furthermore, flashing of headlights by the other-vehicle 16 may be interpreted as an indication that the other-vehicle 16 is unable to stop.

Accordingly, a safe-to-proceed system (the system 10), a controller 24 for the system 10, and a method of operating the system 10 is provided. While the examples presented herein are specifically directed to the system 10 having the host-vehicle 12 wait 40 when it appears that the other-vehicle 16 is not going to stop before entering the intersection 14, it is also contemplated that system 10 will operate the host-vehicle 12 to proceed 58 into the intersection 14 when the speed 28 and the distance of the other-vehicle 16 from the intersection 14 indicate that the host-vehicle 12 has time to enter and sufficient proceed through the intersection 14 to avoid a collision or interference with the other-vehicle 16.

While this invention has been described in terms of the preferred embodiments thereof, it is not intended to be so limited, but rather only to the extent set forth in the claims that follow.

We claim:

1. A safe-to-proceed system for operating an automated vehicle proximate to an intersection, said system comprising:
an intersection-detector suitable for use on a host-vehicle, said intersection-detector used to determine when the host-vehicle is proximate to an intersection;
a vehicle-detector suitable for use on the host-vehicle, said vehicle-detector used to estimate a stopping-distance of an other-vehicle approaching the intersection, wherein the estimate of the stopping-distance of the other-vehicle is influenced by road condition messages received by the host-vehicle that originate from vehicles that have previously passed the intersection; and a controller in communication with the intersection-detector and the vehicle-detector, said controller configured to prevent the host-vehicle from entering the intersection when the estimate of the stopping-distance indicates that the other-vehicle will enter the intersection before stopping.

2. The system in accordance with claim 1, wherein the intersection-detector includes one of a digital-map, a camera, a lidar-unit, and a radar-unit.

3. The system in accordance with claim 1, wherein the host-vehicle is equipped with headlights and a horn, and the controller is configured to flash the headlights and activate the horn when the stopping-distance indicates that the other-vehicle will enter the intersection before stopping.

4. The system in accordance with claim 1, wherein the system further comprises a transmitter used to transmit a warning-signal, and the controller is further configured to activate the transmitter to transmit the warning-signal when the stopping-distance indicates that the other-vehicle will enter the intersection before stopping.

5. The system in accordance with claim 1, wherein the vehicle-detector influences the estimate of the stopping-distance in response to less than optimum road traction-conditions by increasing the stopping-distance of the other-vehicle.

6. The system in accordance with claim 1, wherein the vehicle-detector influences the estimate of the stopping-distance in response to detected traction loss by the host-vehicle by increasing the estimate of the stopping-distance of the other-vehicle.

7. The system in accordance with claim 1, wherein the vehicle-detector influences the estimate of the stopping-distance of the other-vehicle based on, at least in part, a slope of a travel-lane of the other-vehicle.

\* \* \* \* \*